United States Patent [19]
Suda et al.

[11] Patent Number: 6,059,954
[45] Date of Patent: May 9, 2000

[54] ELECTROCHEMICAL MACHINING METHOD AND ELECTROCHEMICAL MACHINING EQUIPMENT

[75] Inventors: Masayuki Suda; Toshihiko Sakuhara; Tatsuaki Ataka, all of Chiba, Japan

[73] Assignee: Seiko Instruments Inc., Japan

[21] Appl. No.: 09/047,855

[22] Filed: Mar. 25, 1998

[30] Foreign Application Priority Data

Mar. 28, 1997 [JP] Japan .................................... 9-078406

[51] Int. Cl.[7] ............................. B23H 3/00; C25B 15/00
[52] U.S. Cl. ......................... 205/645; 205/654; 205/686; 204/229.8; 204/230.1; 204/225; 204/224 M
[58] Field of Search ................................... 205/641–644, 205/652, 654, 686; 204/224 M, 228.1, 228.8

[56] References Cited

U.S. PATENT DOCUMENTS

| | | | |
|---|---|---|---|
| 3,448,024 | 6/1969 | Philpott ................................... | 205/642 |
| 3,627,667 | 12/1971 | Plofsky ................................ | 205/641 X |
| 3,650,923 | 3/1972 | Berghausen et al. .................... | 205/643 |
| 4,264,417 | 4/1981 | Vasiliev et al. .......................... | 205/642 |

FOREIGN PATENT DOCUMENTS 41-20205   11/1941   Japan .

*Primary Examiner*—Donald R. Valentine
*Attorney, Agent, or Firm*—Adams & Wilks

[57] ABSTRACT

An electrochemical machining method in which a work piece and a machining electrode are opposed to each other and dipped in an electrolyte solution, and a surface of the work piece is machined by causing an electrolytic reaction between the surface of the work piece and a tip of the machining electrode in a state where a separating distance between the surface of the work piece and the tip of the machining electrode is adjusted and a desired separating distance is maintained, wherein a zero contact reference position where the surface of the work piece and the tip of the machining electrode are brought into contact with each other and the separating distance between the work piece and the machining electrode is nullified is electrically detected, moving distances of the work piece and the machining electrode from the zero contact reference position are detected, a relative separating distance between the surface of the work piece and the tip of the machining electrode is calculated based on a result of the detection and the work piece is machined in a state where the desired separating distance is maintained.

10 Claims, 9 Drawing Sheets

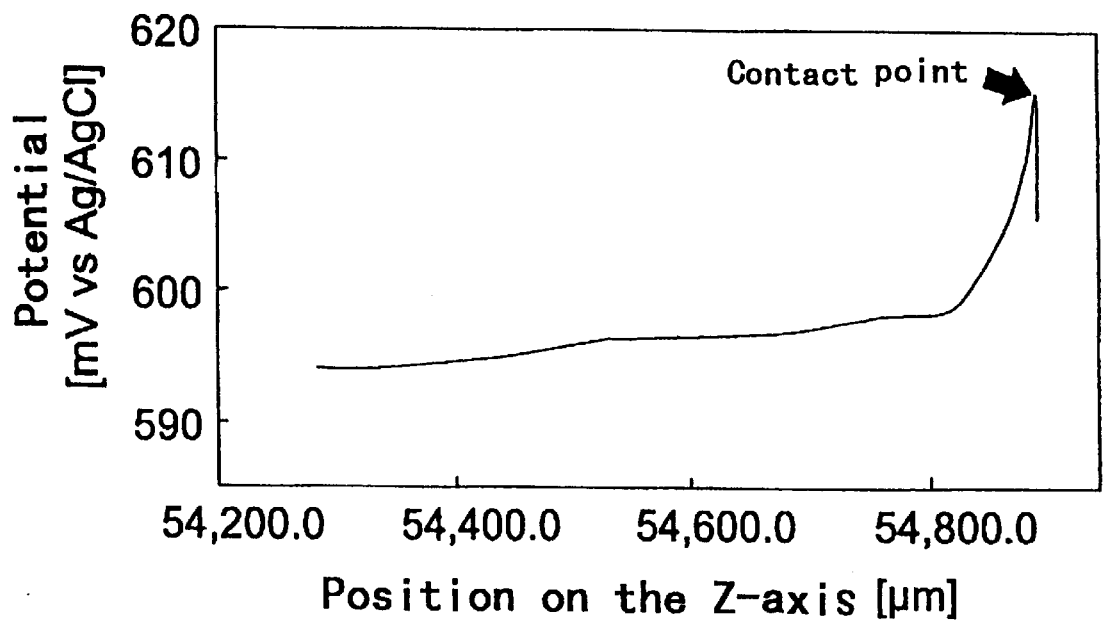

ELECTROCHEMICAL MACHINING METHOD AND ELECTROCHEMICAL MACHINING EQUIPMENT

BACKGROUND OF THE INVENTION

The present invention relates to an electrochemical machining method and an electrochemical machining equipment for carrying out micromachining by an electrochemical reaction using a machining electrode in an electrolytic solution in the fields of metal industry, electronic industry and the like, and particularly to an electrochemical machining method and an electrochemical machining equipment carrying out electrochemical machining while maintaining a predetermined distance between a machining electrode and a work piece with a reference of a zero contact reference position nullifying the distance between the machining electrode and the work piece.

There has conventionally been known a method of carrying out micromachining of a work piece by an electrochemical reaction using a stylus having a fine tip in a solution in the fields of metal industry, electronic industry and the like (Japanese Unexamined Patent Publication No. JP-A-06-299390).

According to the method, it is necessary to shorten a distance between a machining electrode and a work piece in order to promote machining accuracy. It is necessary to make the distance between a machining electrode and a work piece fall in a range of 10 $\mu$m (micrometer) or less when machining is carried out with an accuracy of a micrometer order and it is difficult to control such a very small distance with high accuracy. The reason is that 1. a machining electrode and a work piece are present in a solution, 2. although there is a technology capable of measuring with high accuracy a change in a relative distance as in a laser displacement meter or the like, according to such a measuring method, the absolute distance cannot be measured unless the point of the distance cannot be specified, and so on. Hence, a method where a point at which a machining electrode and a work piece are brought into contact with each other is measured by some method, the point is set to the original point and the distance is measured by using a separate highly accurate scale, is conceivable. As a method of detecting the contact, 1. a method of measuring a resistance value between a machining electrode and a work piece and the like are conceivable. Further, as another method of measuring a very small distance, 2. measuring an electrostatic capacity between a machining electrode and a work piece, 3. measuring a tunnel current and the like are conceivable. However, according to these methods, the following problems exist.

Accordingly to the first method, there are cases where the surface of the machining electrode or the work piece is covered with a thin oxide film or the like and the contact may not be detected unless the machining electrode is pushed to the work piece with some degree of force. A diameter of a distal end of the machining electrode is several hundreds $\mu$m or less to promote machining accuracy and therefore, there poses a technical problem where the distal end is crushed when it is pushed hard.

Further, it is necessary to apply a voltage between the machining electrode and the work piece to measure the resistance value and when the reactivity of the work piece is high in an electrolyte solution, there also poses a technical problem where when a voltage larger than a standard electrode potential difference is applied between the machining electrode and the work piece, an electrochemical reaction is caused by the voltage and machining is performed.

Further, according to the second method, when the kind or concentration of used solution is changed, the dielectric constant is also changed and therefore, it is necessary to previously measure a relationship between the distance between electrodes and the electrostatic capacity. Further, there poses a technical problem where in measuring the electrostatic capacity in a solution, a measured value is liable to suffer influence of noise which is caused by convection of the solution or the like.

Further, according to the third method, although the method is ideal for detecting the original point since the method is performed strictly in a noncontact state, a diameter of a distal end of the machining electrode needs to be made very small for detecting tunnel current in a solution in order to exclude influence of Faraday current, charge current to an electric double layer and the like and when the diameter of the distal end of the machining electrode is reduced to several tens through several hundreds $\mu$m (micrometer) in order to promote machining speed, there poses a technical problem where detection of tunnel current in a solution is very difficult.

SUMMARY OF THE INVENTION

It is an object of the present invention to provide an electrochemical machining method and an electrochemical machining device where the diameter of a distal end of a machining electrode is prevented from crushing.

It is another object of the present invention to provide an electrochemical machining method and an electrochemical machining device where influence of kind or concentration of a solution or noise is not effected.

It is another object of the present invention to provide an electrochemical machining method and an electrochemical machining device where detection of tunnel current is not needed.

It is a further object of the present invention to provide an electrochemical machining method and an electrochemical machining device where an electrolytic reaction is prevented from occurring when a reference point of the distance is set.

BRIEF DESCRIPTION OF THE DRAWINGS

FIG. 6 is a graph showing an experimental example in which contact between a surface of a work piece and a tip a machining electrode is detected by using the electrochemical machining equipment related to FIG. 2;

DETAILED DESCRIPTION OF THE PREFERRED EMBODIMENTS

Figure 1A:
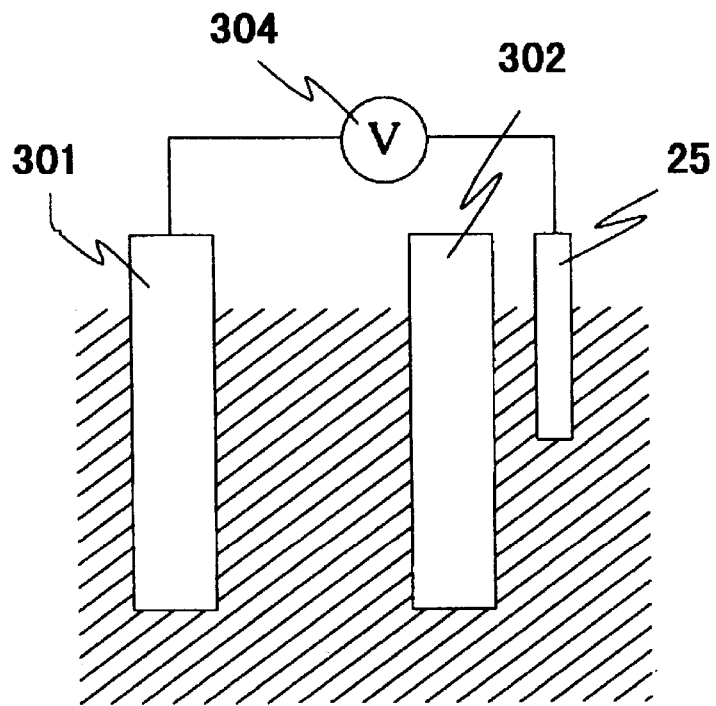
FIGS. 1A and 1B are partly sectional schematic illustrations showing the principle of the present invention.

Hence, according to an aspect of the present invention, there is provided an electrochemical machining method in which a work piece and a machining electrode are opposed to each other and dipped in an electrolyte solution, and a surface of the work piece is machined by causing an electrolytic reaction between the surface of the work piece and a tip of the machining electrode in a state where a separating distance between the surface of the work piece and the tip of the machining electrode is adjusted and a desired separating distance is maintained, wherein a zero contact reference position where the surface of the work piece and the tip of the machining electrode are brought into contact with each other and the separating distance between the work piece and the machining electrode is nullified is electrically detected, moving distances of the work piece and the machining electrode from the zero contact reference position are detected, a relative separating distance between the surface of the work piece and the tip of the machining electrode is calculated based on a result of the detection and the work piece is machined in a state where the desired separating distance is maintained.

Further, in view of preventing electrochemical reaction of the work piece when the work piece is not machined, current is prevented from flowing between the work piece and the machining electrode when the work piece is not machined.

Further, according to another feature of the electrochemical machining device, there is provided an electrochemical machining device including work piece holding means for holding a work piece in an electrolyte solution, a machining electrode for machining a surface of the work piece by an electrolytic reaction and separating distance changing means for detecting and changing a separating distance between the surface of the work piece held by the work piece holding means and a tip of the machining electrode. The electromechanical machining device comprises:

contact state detecting means for detecting a contact state when the work piece and the machining electrode are brought into contact with each other by changing the separating distance between the surface of the work piece and the tip of the machining electrode by the separating distance changing means;

zero contact reference position determining means for determining based on the detection by the contact state detecting means a contact position at the detection time as a zero contact reference position nullifying the mutually separating distance;

zero contact reference position storing means for storing the zero contact reference position determined by the zero contact reference position determining means;

moving distance calculating means for calculating respectively moving distances of the work piece and the machining electrode from the zero contact reference position;

relative separating distance calculating means for calculating a relative separating distance between the surface of the work piece and the tip of the machining electrode based on the calculation by the moving distance calculating means; and relative separating distance adjustment controlling means for making the separating distance changing means adjust the relative separating distance between the surface of the work piece and the tip of the machining electrode based on the calculation by the relative separating distance calculating means in accordance with a set value of the separating distance.

The electrochemical machining device may include current controlling means for preventing current from flowing between the work piece and the machining electrode when the work piece is not machined.

In respect of the means for solving the above-described problems, the separating distance changing means is operated in any of a case where only the side of the work piece is moved, a case where only the side of the machining electrode is moved and a case where both of the work piece and the machining electrode are moved.

Further, a state where the surface of the work piece and the distal end of the machining electrode are brought into contact with each other, includes not only a case where both are brought into complete contact with each other physically but a case where the distal end of the machining electrode is regarded to be brought into electric contact with the surface of the work piece.

An explanation will be given of the principle of the present invention as follows.

As shown by, for example, FIG. 1A, when two kinds of metal plates A301 and B302 are dipped in a solution in a noncontact state, it is assumed that the following reaction is caused and the metal plate A301 is more liable to ionize than the metal plate B302.

In this case, as a reaction caused on the metal plate A301,

$$M_1 \rightarrow M_1^{n+} + ne- \tag{1}$$

$$M_1^{n+} + ne- \rightarrow M_1 \tag{2}$$

As a reaction caused on the metal plate B302,

$$M_2 \rightarrow M_2^{n+} + ne- \tag{3}$$

$$M_2^{n+} + ne- \rightarrow M^2 \tag{4}$$

The equilibrium potential of the metal plate A301 is a potential when the reactions of Equation (1) and Equation (2) are brought into an equilibrium state and the equilibrium potential of the metal plate B302 is a potential when the reactions of Equation (3) and Equation (4) are brought into an equilibrium state.

In this case, when the metal plate A301 is assumed to be a work piece and the metal plate B302 is assumed to be a machining electrode and the potential of the work piece is measured with a reference of a reference electrode, as the potential of the work piece, the potential where the reactions of Equation (1) and Equation (2) are brought into an equilibrium state is measured.

Figure 1B:
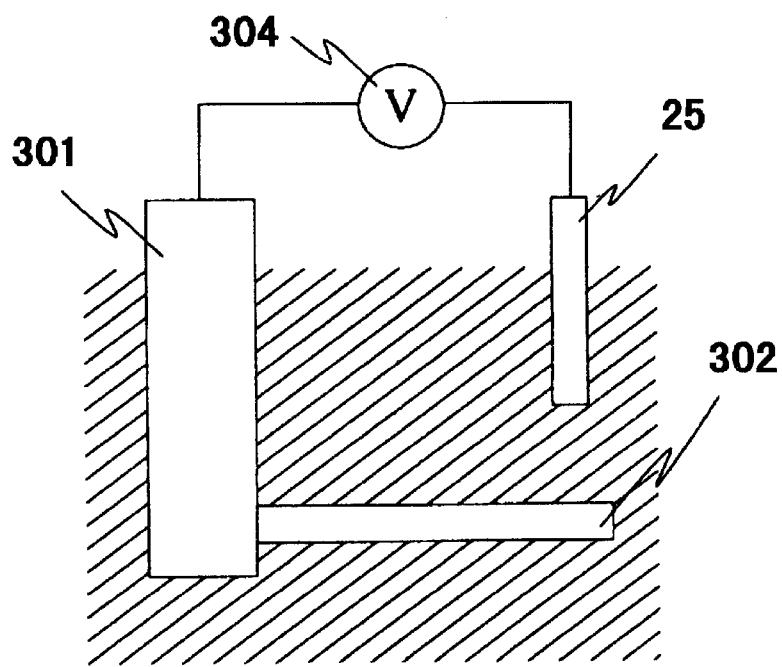

Meanwhile, as shown by FIG. 1B, when the metal plate B302 is brought into contact with the metal plate A301, since the metal plate A301 is more liable to ionize than the metal plate B302, the reaction of Equation (1) is more liable to occur than the reaction of Equation (3) and the reaction of Equation (4) is more liable to occur than Equation (2). Accordingly, it is predicted that the potential mainly of the equilibrium states of the reactions of Equation (1) and Equation (4) is measured.

As described above, a change in the equilibrium state of chemical reaction occurs when the metal plates are brought into contact with each other and therefore, the contact between the machining electrode 301 and the work piece 302 can be detected by monitoring, for example, a voltage of the work piece in respect of the reference electrode 25.

Further, from a microscopic view point, an electric double layer having the ionic density different from that in a solution is present at an interface between the metal and the solution and the thickness of the layer is at a nanometer order. Accordingly, it is conceivable that the potential difference is changed before the physical contact and therefore, the reference position can be set in a noncontact state by detecting the change.

Next, an explanation will be given of the operation of the present invention.

When the work piece is not machined, for example, the potential of the work piece is measured by contact state setting means while making the surface of the work piece and the distal end of the machining electrode proximate to each other by separating distance changing means.

When the surface of the work piece and the distal end of the machining electrode are brought into contact with each other, the potential change of the work piece is detected as an electric signal by the contact state detecting means and the position is determined as the zero contact reference position by the zero contact reference position determining means based on the detection.

Further, the electric machining is carried out by adjusting the separating distance between the surface of the work piece a nd the distal end of the machining electrode to a desired separating distance with the zero contact reference position as the reference.

Embodiment 1

Figure 2:
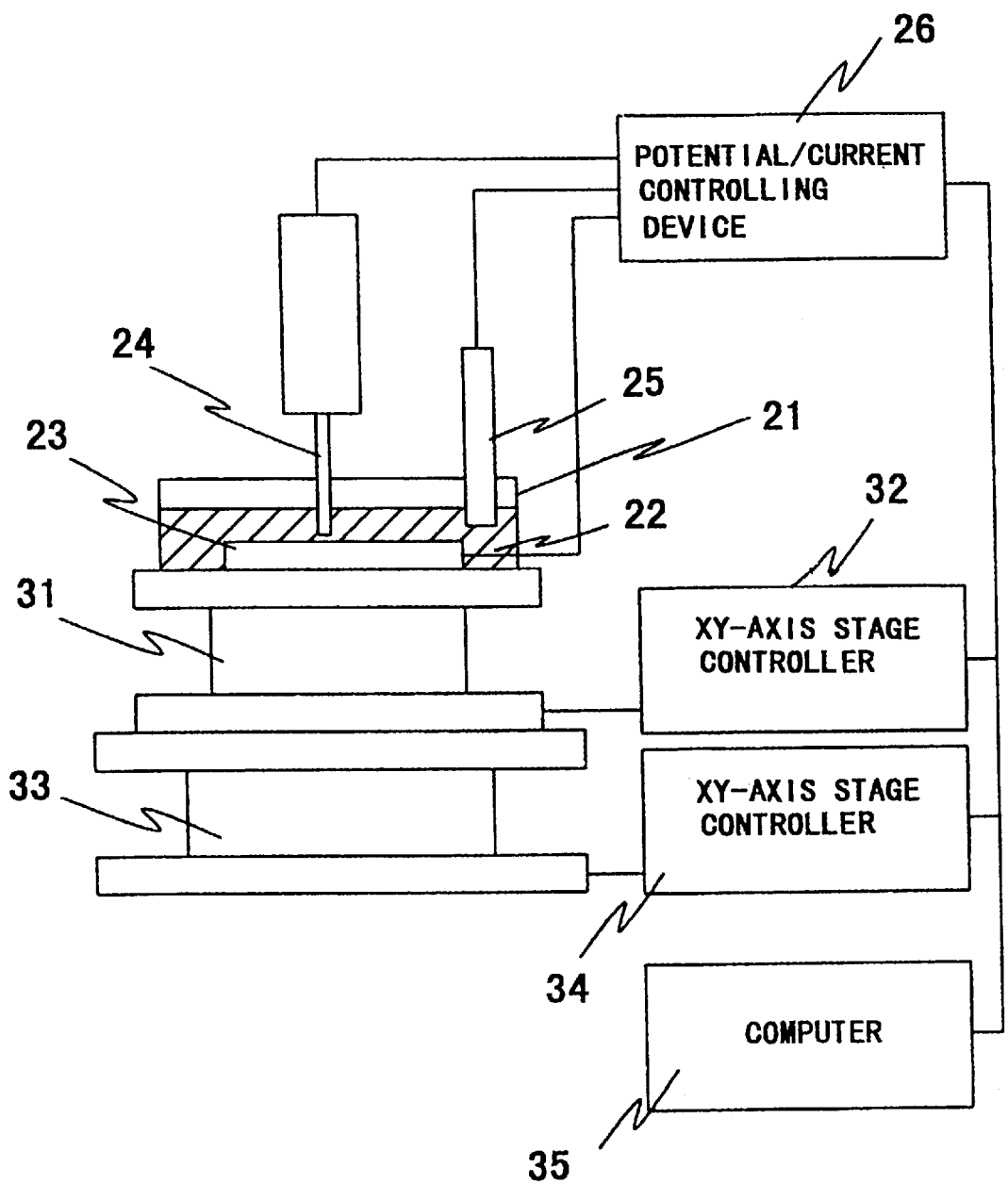
FIG. 2 is a partly sectional schematic illustration showing Embodiment 1 in which the present invention is applied to an electrochemical machining device.

FIG. 2 shows Embodiment 1 in which the present invention is applied to an electrochemical machining equipment.

This embodiment is constituted by a work piece 23 dipped into a electrolytic solution 22 in a electrolytic solution vessel 21, a machining electrode 24 arranged opposedly to the work piece 23 for carrying out electrochemical machining in respect of the work piece 23, a reference electrode 25 constituting a reference of electrode potential, a potential/current controlling device 26 for controlling potential and current of the machining electrode 24, a Z-axis stage 31 installed on the lower side of the electrolytic solution vessel 21 which can move the work piece 23 in Z-axis direction (vertical direction), an XY-axis stage 33 installed on the lower side of the Z-axis stage 31 which can move the work piece 23 in X-axis direction and Y-axis direction (horizontal direction), a Z-axis stage controller 32 for controlling movement of the Z-axis stage 31, an XY-axis stage controller 34 for controlling movement of the XY-axis stage 33 and a computer 35 for controlling a total of the device.

In this case, the computer 35 is connected to the potential/current controlling device 26 and the Z-axis stage controlling device 32 and is capable of measuring and controlling the potential of the machining electrode 24 and current flowing between the machining electrode 24 and the work piece 23 and transmitting and receiving signals indicating a moving amount or a moving position of the Z-axis stage 31 in Z-axis direction, a detection signal of the zero contact reference position and the like.

The potential/current controlling device 26 is provided with, for example, a machining electrode circuit 26A referred to as potentio/galvanostat, a microcomputer for controlling the potential of the machining electrode 24 of the machining electrode circuit 26A, the current flowing between the machining electrode 24 and the work piece 23 and the like as well as various operation switches for operating the device and the like. Incidentally, the contact state detecting means according to the present invention corresponds to, for example, a potentiometer 304 integrated to the device 26.

Figure 3:
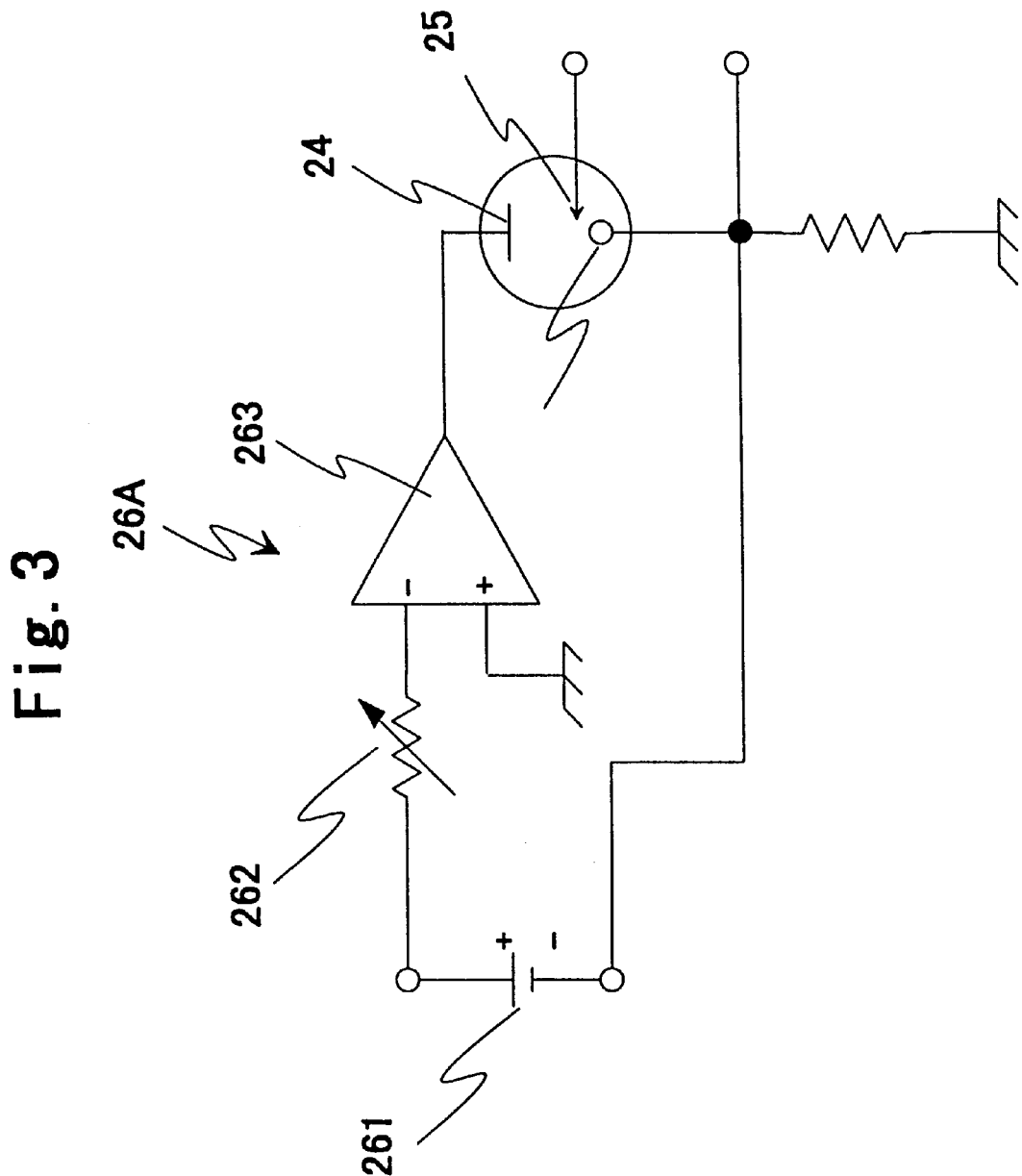
FIG. 3 is a circuit diagram showing an example of a constant current circuit related to FIG. 2.

As shown by, for example, FIG. 3, the machining electrode circuit 26A is constituted by a variable resistor 262 connected to the plus side of a constant voltage source 261, an operational amplifier 263 connected to the variable resistor 262, the opposed electrode (machining electrode) 24 connected to an output portion of the operational amplifier 263, the working electrode (work piece) 23 arranged opposedly to the counter electrode (machining electrode) 24 and connected to the minus side of the constant voltage source 261, the reference electrode 25 constituting a reference for measuring the potential of the working electrode 23 and the like.

The machining electrode 24 is a rod-like body, a tip thereof opposed to the work piece is sharpened, only a portion of the most tip is exposed and the other portion is covered with an insulator. Further, as a material of the rod-like body, for example, carbon, tungsten, platinum or the like is used.

Further, the reference electrode 25 is, for example, a glass cylindrical body and a distal end thereof on the side of dipping into a machining solution is provided with a liquid path, a slender wire comprising silver is provided at the center of the cylindrical body to reach a glass film portion and a silver chloride solution is filled to dip the slender wire.

According to the machining electrode circuit 26A, the current flowing between the counter electrode (machining electrode) 24 and the working electrode (work piece) 23 can also be nullified or switched to a required current necessary for electrochemical machining by changing the resistance value of the variable resistor 262.

Figure 4A:
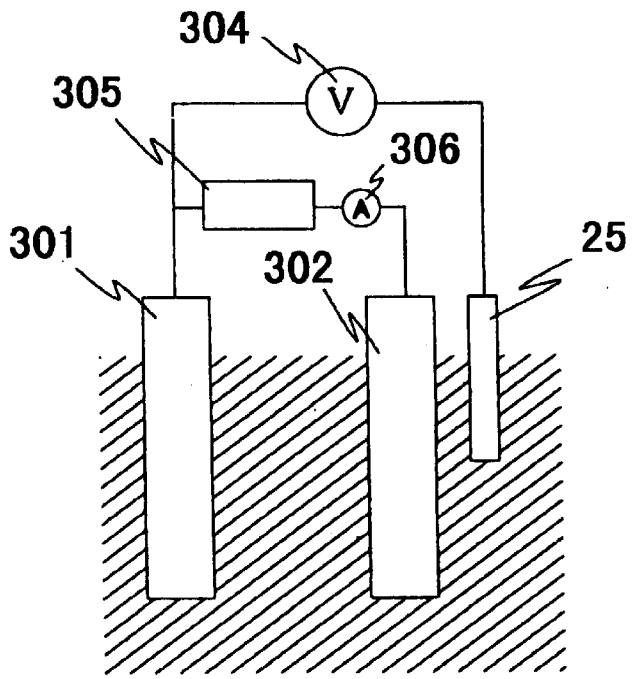
FIGS. 4A and 4B are partly sectional schematic illustrations showing concepts of circuits related to FIG. 2.
Figure 4B:
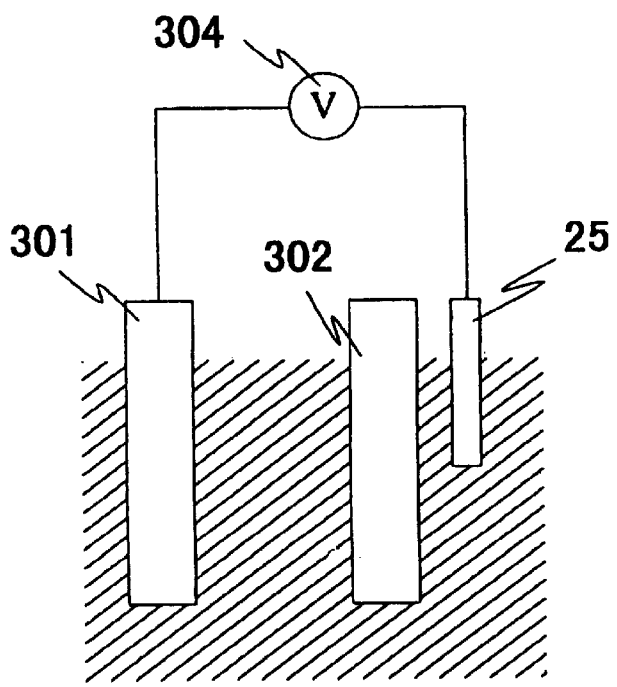

According to the embodiment, as shown by a conceptual view of FIG. 4A, a constant current source 305 for detection is provided, whereby current is prevented from flowing between the work piece 301 and the machining electrode 302 when the zero contact reference position is detected and the potential of the work piece 301 is measured with the reference electrode 25 as the reference; however, as shown by FIG. 4B, when the work piece 301 is stable in the electrolytic solution, the constant current source for detection for preventing current from flowing between the work piece 301 and the machining electrode 302 may not be integrated.

The computer 35 is provided with zero contact reference position determining means for determining the position of the Z-axis stage 31 as the zero contact reference position when a contact state where the distance between the surface of the work piece 23 and the tip of the machining electrode 24 is nullified, is electrically detected as a change in the potential of the work piece 23 functioning as contact state detecting means, zero contact reference position storing means for storing the zero contact reference position that is determined by the zero contact reference position determining means, moving distance calculating means for receiving a moving amount signal informing a moving amount of the Z-axis stage 31 from the Z-axis stage controlling device 33 and calculating the moving distance from the zero contact reference position based on the moving amount signal, relative separating distance calculating means for calculating a relative separating distance between the surface of the work piece 23 and the distal end of the machining electrode 24 based on the calculation by the moving distance calculating means, and relative separating distance adjustment controlling means for transmitting to the Z-axis stage controlling device 32 a moving adjustment controlling signal for adjusting to move the Z-axis stage 31 in Z-axis direction by driving means of the Z-axis stage 31 in accordance with a set value of the distance inputted from outside by operating an operation key or the like and based on the calculation by the relative distance calculating means, and the like.

The Z-axis stage 31 and the XY-axis stage 33 are respectively moved in Z-axis direction and XY-axis directions by electric driving means under control by the Z-axis stage controller 32 and the XY-axis stage controller 34 and moving amounts and moving positions of these are electrically measured.

A moving amount signal, a moving position signal and the like informing the moving amount, the moving position and the like of the Z-axis stage 31 in Z-axis direction are transmitted from the Z-axis stage controller 32 to the potential/current controlling device 26 and a moving amount signal, a moving position signal and the like informing the moving amount, the moving position and the like of the XY-axis stage 33 in X-axis and Y-axis directions, are transmitted from the XY-axis stage controller 34 to the computer 35.

Figure 5:
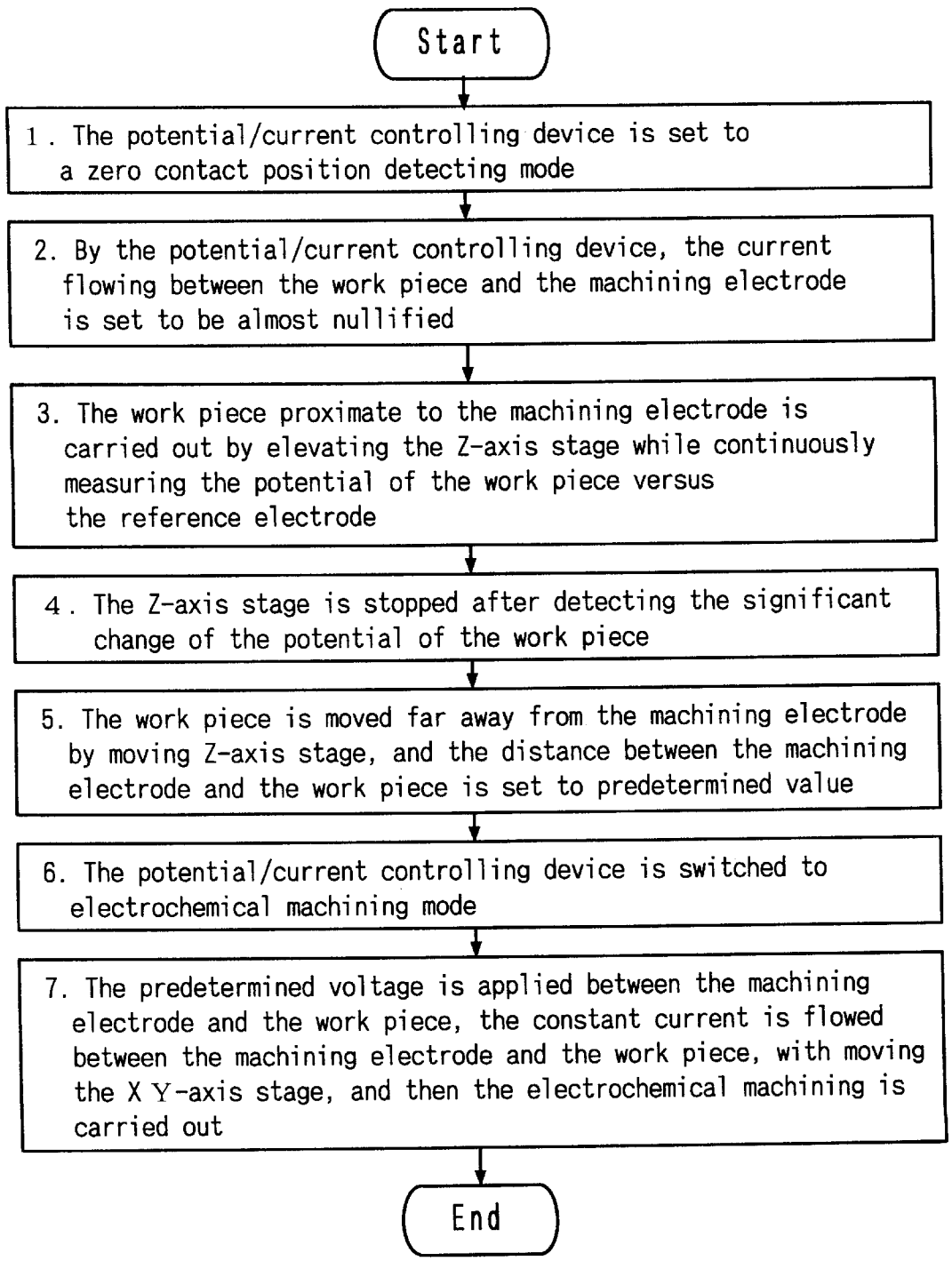
FIG. 5 is a flowchart showing a method of use related to FIG. 2.

An explanation will be given of a method of using the electrochemical machining device according to the embodiment in reference to FIG. 5.

First, the potential/current controlling device 26 is set to a zero contact reference position detecting mode.

Next, under the mode state, the variable resistor 262 of the machining electrode circuit 26A is increased almost to infinity and the current flowing between the work piece 23 and the machining electrode 24 is almost nullified.

Under the mode state, the electrochemical reaction which amounts to machining phenomenon is not caused between the work piece 23 and the machining electrode 24 even when the work piece 23 is made proximate to the machining electrode 24.

Next, under the state, an operation of making the work piece 23 proximate to the machining electrode 24 is carried out by slowly elevating the Z-axis stage 31 while measuring the potential of the work piece 23.

When the work piece 23 is brought into contact with the machining electrode 24 by the elevating operation, the potential of the work piece 23 functioning as the contact state detecting means is significantly changed and therefore, the zero contact reference position determining means of the computer 35 determines the position on the Z-axis as the zero contact reference position based on the change. Further, at the time point, elevation of the Z-axis stage 31 is stopped by transmitting a stop signal from the computer 35 to the Z-axis stage controller 32. Further, the zero contact reference position of the Z-axis stage 31 at that time is stored to the computer 35 and the Z-axis stage controller 32.

Next, by adjusting movement of the Z-axis stage 31 by operating electrical driving means under control of the Z-axis stage controller 32 with the zero contact reference position as a reference, the separating distance between the machining electrode 24 and the work piece 23 is controlled to a desired separating distance.

The desired separating distance is calculated when the moving distance calculating means of the computer 35 receives the moving amount signal informing the moving amount of the Z-axis stage 31 from the Z-axis stage controlling device 33 and calculates the moving distance from the zero contact reference position and the relative separating distance calculating means of the computer 35 calculates the relative separating distance between the surface of the work piece 23 and the distal end of the machining electrode 24 based on the calculation of the moving distance.

Further, at the time point where a desired separating distance is achieved, the computer 35 transmits a stop signal to the Z-axis stage controlling device 32 and the Z-axis stage 31 is stopped.

Next, the potential/current controlling device 26 is switched to an electrochemical machining electrode mode.

Further, under a state where the desired relative separating distance is maintained, a predetermined voltage is applied between the machining electrode 24 and the work piece 23 by the potential/current controlling device 26, the XY-axis stage is moved and the electrochemical machining is carried out.

According to the embodiment, as described above, the position of bringing the work piece 23 and the machining electrode 24 in contact with each other is electrically detected, the position of the Z-axis stage 31 at the detection time is determined as the zero contact reference position, the downward moving distance of the Z-axis table 31 from the zero contact reference position is set to the separating distance between the work piece 23 and the machining electrode 24, the separating distance is changed to the desired separating distance and electrochemical machining is carried out with respect to the work piece 23 and accordingly, it can be prevented that in specifying the zero contact reference position, the distal end of the machining electrode 24 is brought into physical contact with the work piece 23 and the distal end of the machining electrode 24 and the work piece 23 are deformed by which the zero contact reference position is shifted and the desired separating distance becomes inaccurate.

Further, the distal end of the machining electrode 24 is prevented from being crushed, influence of kind of solution or noise is not effected and tunnel current needs not to be detected.

Further, during a time period where the separating distance between the work piece 23 and the machining electrode 24 is being set, current is prevented from flowing to the machining electrode 24 and therefore, electrochemical reaction is not caused on the work piece and machining phenomenon is not caused.

FIG. 6 shows an experimental example where the zero contact reference position for bringing the surface of the work piece 23 and the distal end of the machining electrode 24 into contact with each other is electrically detected by using the electrochemical machining device to which the embodiment is applied.

In the figure, X-axis designates a distance of the Z-axis stage 31 from a mechanical original point and Y-axis designates the potential of the work piece 23 with the reference electrode 25 as a reference.

In the experiment, a platinum wire sharpened to 100 $\mu$m (micrometer) was used for the distal end of the machining electrode 24, a chromium plate was used for the work piece 23 and a silver/silverchloride electrode was used for the reference electrode 25.

As an experimental method, while nullifying current flowing between the machining electrode 24 and the work piece 23, a potential of the work piece 23 is measured with a reference of the reference electrode 25, the position of the Z-axis stage is changed and the contact position is detected while making the work piece 23 and the machining electrode 24 proximate to each other.

According to the figure, a potential of the work piece 23 shows initially a substantially constant value whereas the potential is increased rapidly at the midway and a peak is shown.

Accordingly, it is understood that the peak is detected as the contact position.

Modified embodiments

FIGS. 7 and 8 show conceptual views with respect to modified embodiments.

Figure 7A:
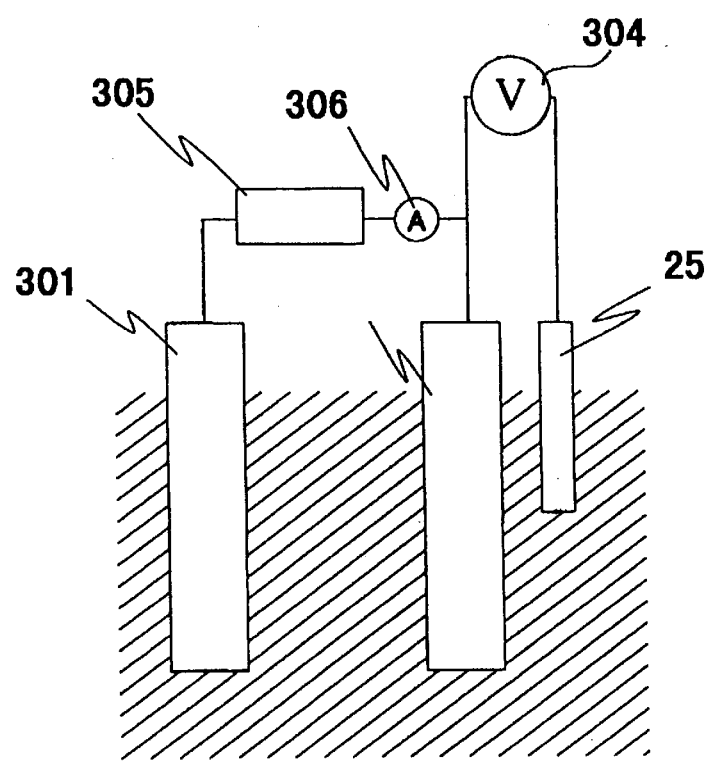
FIGS. 7A and 7B are partly sectional schematic illustrations showing the concept related to modified embodiments of electrochemical machining equipment to which the present invention is applied.

Although a first mode of the modified embodiments is provided with a constitution substantially similar to that of Embodiment 1, the first mode is featured in detecting the contact position by measuring the potential of the machining electrode 302 as shown by FIG. 7A.

The contact position is detected by a similar procedure also by this method.

Figure 7B:
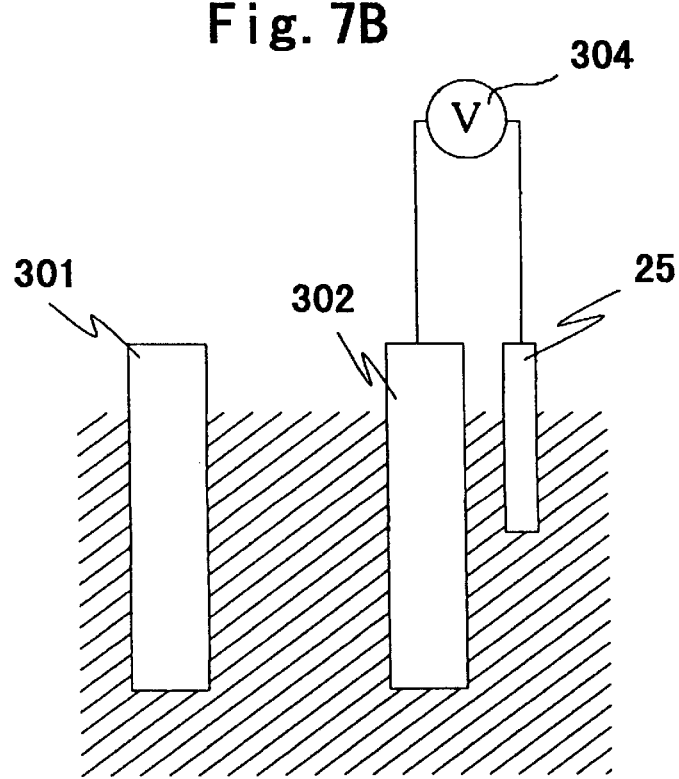

Further, as shown by FIG. 7B, when the work piece 301 is stable in a machining solution, a constant current source for detection of the contact position which prevents current from flowing in the machining electrode 302 when the contact position is detected may not be used.

Figure 8A:
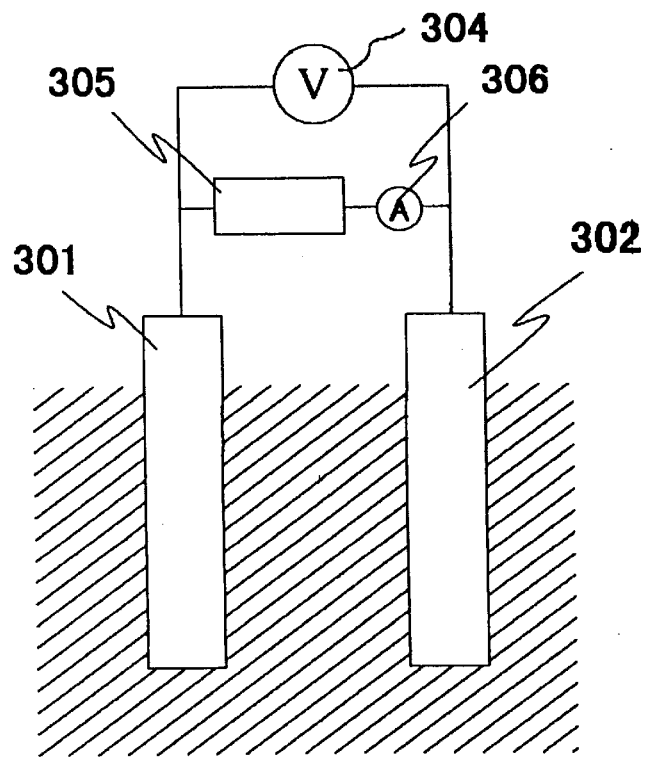
FIGS. 8A and 8B are partly sectional schematic illustrations showing the concept related to modified embodiments of electrochemical machining devices to which the present invention is applied.

A second mode of the modified embodiments is provided with a constitution substantially similar to the embodiment, however, as shown by FIG. 8A, the second mode is featured in detecting the contact position by measuring a potential difference between the work piece 301 and the machining electrode 302.

In this way, the potential difference is nullified at the contact position of the work piece 301 and the machining electrode 302 by which the contact time point can be detected.

Figure 8B:
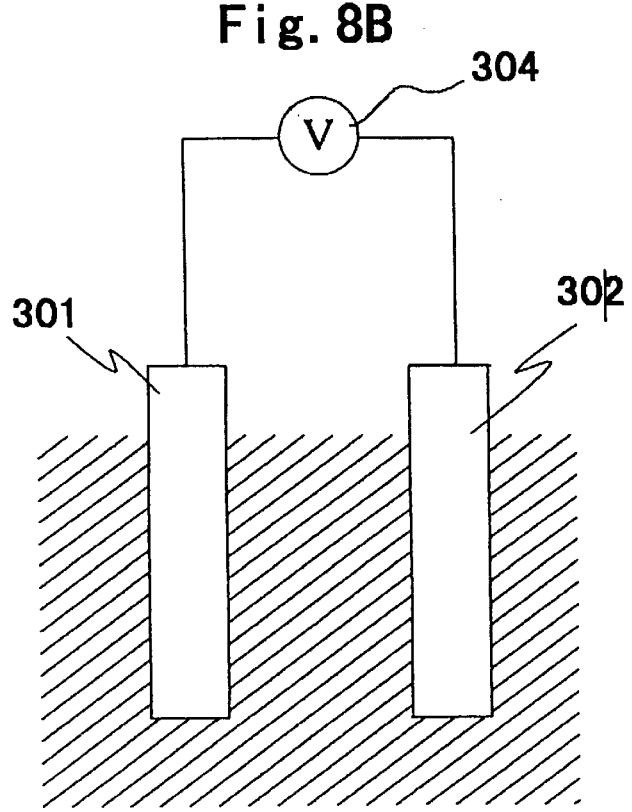

Further, similarly, as shown by FIG. 8B, even with a constitution where a constant current source is not used, the contact position is detected.

Embodiment 2

Figure 9:
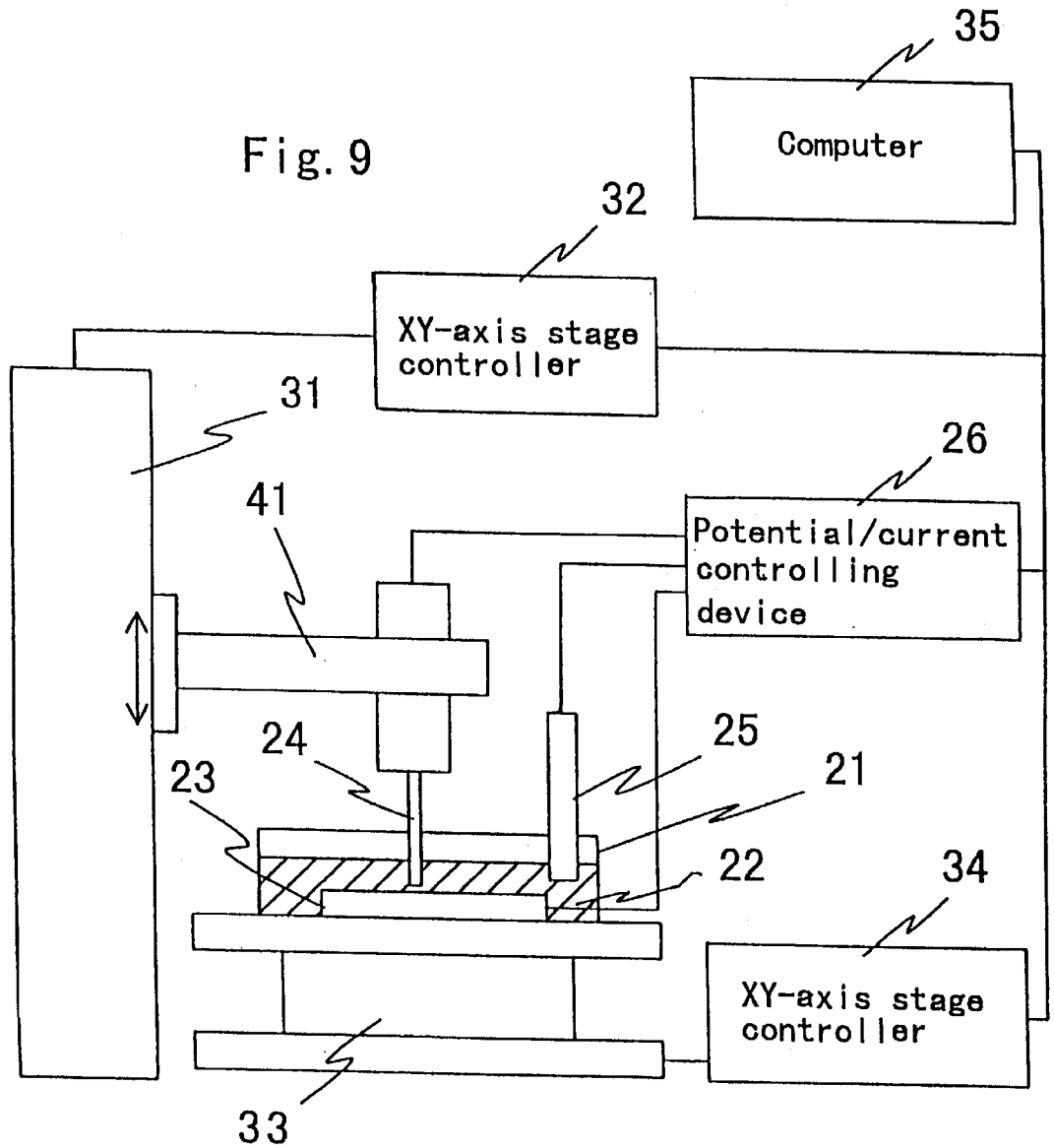
FIG. 9 is a partly sectional schematic illustration showing Embodiment 2 in which the present invention is applied to an electrochemical machining equipment.

As shown by FIG. 9, although the embodiment is provided with a constitution substantially similar to that of Embodiment 1, Embodiment 2 is featured in that the machining electrode 24 is attached to the Z-axis stage 31 controlled by the Z-axis stage controlling device 32 via a machining electrode attaching arm 41.

According to the operation of the device, by moving the machining electrode attaching arm 41 upwardly and downwardly in Z-axis direction, the machining electrode 24 is made to follow the machining electrode attaching arm 41 and the separating distance in respect of the surface of the work piece 23 is set.

Also in this way, an effect similar to that of Embodiment 1 is achieved.

According to the present invention, as described above, the contact position (contact point) of the work piece and the machining electrode is electrically detected, the position at the detection time is determined as the zero contact reference position, an interval between the work piece and the machining electrode formed by movement from the zero contact reference position is set to the separating distance, the separating distance is changed to the desired separating distance and electrochemical machining is carried out in respect of the work piece. Accordingly, it can be prevented that in specifying the zero contact reference position, the distal end of the machining electrode is brought into physical contact with the work piece and the distal end of the machining electrode and the work piece are deformed by which the zero contact reference position is shifted and the desired separating distance becomes inaccurate.

Further, the distal end of the machining electrode is prevented from being crushed when the contact position of the work piece and the machining electrode is determined as the zero contact reference position, influence of kind of solution or noise is not effected and tunnel current needs not to be detected.

Further, current is prevented from flowing to the machining electrode during a time period where the separating distance between the work piece and the machining electrode is being set and therefore, electrochemical reaction is not caused on the work piece and also machining phenomenon is not caused.

What is claimed is:

1. An electrochemical machining method comprising the steps of:

disposing a work piece and a machining electrode in an electrolyte solution;

bringing a surface of the work piece and a tip of the machining electrode into contact with each other and electrically detecting a contact reference position of the surface of the work piece and the tip of the machining electrode by detecting a variation of an equilibrium potential of the machining electrode or the work piece;

moving at least one of the work piece and the machining electrode from the contact reference position;

calculating a relative distance between the surface of the work piece and the tip of the machining electrode with respect to the contact reference position; and machining the work piece by causing an electrolytic reaction between the surface of the work piece and the tip of the machining electrode while maintaining relative distance between the surface of the work piece and the tip of the machining electrode.

2. An electrochemical machining method as claimed in claim 1; further comprising the step of preventing the flow of a current between the work piece and the machining electrode when the work piece is not being machined.

3. An electrochemical machining method according to claim 1; wherein the disposing step comprises disposing the work piece and the machining electrode into the electrolyte solution in confronting relation to each other.

4. An electrochemical machining method as claimed in claim 1; wherein the bringing step and the electrically detecting step comprise moving at least one of the work piece and the machining electrode to bring the surface of the work piece and the tip of the machining electrode proximate to one another while measuring the equilibrium potential of the machining electrode or the work piece, determining the state of contact between the work piece and the machining electrode by detecting a change in the equilibrium potential, and stopping movement of the at least one of the work piece and the machining electrode.

5. An electrochemical machining device comprising:

holding means for holding a work piece in an electrolyte solution;

a machining electrode for machining a surface of the work piece by an electrochemical reaction;

distance changing means for adjusting a distance between a surface of the work piece and a tip of the machining electrode;

detecting means for detecting a contact state between the work piece and the machining electrode at a contact reference position when the work piece is brought into contact with the machining electrode by adjusting a distance between the surface of the work piece and the tip of the machining electrode;

storing means for storing the contact reference position;

calculating means for calculating a moving distance of the work piece and the machining electrode from the contact reference position;

relative distance calculating means for calculating a relative distance between the surface of the work piece and the tip of the machining electrode in accordance with the calculation by the calculating means; and relative distance controlling means for controlling the distance changing means to adjust the relative distance between the surface of the work piece and the tip of the machining electrode in accordance with the calculation by the relative distance calculating means and in accordance with a predetermined value of the relative distance.

6. An electrochemical machining device as claimed in claim 5; further comprising current controlling means for preventing the flow of a current between the work piece and the machining electrode when the work piece is not being machined.

7. An electrochemical machining device according to claim 5; wherein the detecting means includes means for measuring an equilibrium potential of the machining electrode or the work piece in the electrolyte solution, and means for determining the state of contact between the work piece and the machining electrode by detecting a change in the equilibrium potential.

8. An electrochemical machining method comprising the steps of:

disposing a work piece and an electrode in an electrolyte solution;

moving at least one of the work piece and the electrode to bring a surface of the work piece and a tip of the electrode proximate to one another while measuring an equilibrium potential of the electrode or the work piece, and determining a state of contact between the surface of the work piece and the tip of the electrode by detecting a variation in the equilibrium potential;

moving at least one of the work piece and the electrode to provide a preselected distance between the surface of the work piece and the tip of the electrode; and machining the work piece by causing an electrolytic reaction between the surface of the work piece and the tip of the electrode while maintaining the preselected distance between the surface of the work piece and the tip of the electrode.

9. An electrochemical machining method according to claim 8; wherein the step of determining a state of contact includes electrically detecting a contact reference position of the surface of the work piece and the tip of the electrode; and wherein the step of moving the least one of the work piece and the electrode to provide the preselected distance comprises moving the at least one of the work piece and the electrode from the contact reference position.

10. An electrochemical machining device comprising: a holder for holding a work piece in an electrolyte solution; an electrode for machining a surface of the work piece in the electrolyte solution; means for bringing the surface of the work piece and a tip of the electrode proximate to one another in the electrolyte solution while measuring an equilibrium potential of the electrode or the work piece and for determining a state of contact between the surface of the work piece and the tip of the electrode by detecting a variation in the equilibrium potential; and means for moving at least one of the work piece and the electrode to provide a preselected distance between the surface of the work piece and the tip of the electrode; wherein the work piece is machined by the electrode by causing an electrolytic reaction between the surface of the work piece and the tip of the electrode while maintaining the preselected distance between the surface of the work piece and the tip of the electrode.

* * * * *